United States Patent [19]

Dever et al.

[11] Patent Number: 5,112,897
[45] Date of Patent: May 12, 1992

[54] HIGH IMPACT POLYSTYRENE CONTAINING LOW MOLECULAR WEIGHT BROMINATED POLYSTYRENE

[75] Inventors: James L. Dever, North Royalton; James C. Gill, Maple Heights, both of Ohio

[73] Assignee: Ferro Corporation, Cleveland, Ohio

[21] Appl. No.: 603,236

[22] Filed: Oct. 25, 1990

Related U.S. Application Data

[62] Division of Ser. No. 362,129, Jun. 6, 1989.

[51] Int. Cl.$^5$ .................................................. C08K 3/10
[52] U.S. Cl. ..................................... 524/412; 524/465; 524/469; 524/577; 252/609
[58] Field of Search ............... 524/411, 412, 468, 471, 524/469; 252/609

[56] References Cited

U.S. PATENT DOCUMENTS

| | | | |
|---|---|---|---|
| 3,075,944 | 1/1963 | Wick et al. | 524/371 |
| 3,830,766 | 8/1974 | Praetzel et al. | 524/341 |
| 3,897,373 | 7/1975 | Bachl et al. | 521/148 |
| 3,943,195 | 3/1976 | Naarmann et al. | 525/185 |
| 3,962,164 | 6/1976 | Praetzel et al. | 524/371 |
| 4,049,622 | 9/1977 | Fleig et al. | 521/98 |
| 4,074,032 | 2/1978 | Naarmann et al. | 525/357 |
| 4,107,231 | 8/1978 | Wurmb et al. | 524/411 |
| 4,137,212 | 1/1979 | Theysohn et al. | 524/411 |
| 4,143,221 | 3/1979 | Naarmann et al. | 525/357 |
| 4,151,223 | 4/1979 | Neuberg et al. | 525/177 |
| 4,200,702 | 4/1980 | Gausepohl et al. | 525/86 |
| 4,301,058 | 11/1981 | Neukirchen et al. | 252/609 |
| 4,352,909 | 10/1982 | Barda et al. | 525/155 |
| 4,360,455 | 11/1982 | Lindenschmidt et al. | 525/357 |
| 4,735,983 | 4/1988 | Takaku et al. | 524/412 |
| 4,857,597 | 8/1989 | Schleifstein | 524/411 |
| 4,879,329 | 11/1989 | Hongo et al. | 524/114 |

FOREIGN PATENT DOCUMENTS

| | | |
|---|---|---|
| 151075 | 9/1981 | Fed. Rep. of Germany . |
| 62-501153 | 5/1987 | Japan . |
| 86/03508 | 9/1986 | PCT Int'l Appl. . |

*Primary Examiner*—John C. Bleutge
*Assistant Examiner*—Mark Sweet
*Attorney, Agent, or Firm*—Hudak & Shunk Co.

[57] ABSTRACT

Effective amounts of low molecular weight brominated polystyrenes unexpectedly provide good property retention and yet achieve desired flame retardance, for example, UL-94 VO in high impact polystyrene. In contrast, high molecular weight brominated styrene polymers (degree of polymerization equals 2,000) do not provide good property retention such as impact strength and toughness in high impact polystyrene. The degree of polymerization of the brominated polystyrenes of the present invention is generally from about 3 to about 20 and can have a considerable variation in the amount of halogenation. The high impact polystyrenes blended with the low molecular weight brominated polystyrenes are readily processed by conventional equipment.

8 Claims, No Drawings

HIGH IMPACT POLYSTYRENE CONTAINING LOW MOLECULAR WEIGHT BROMINATED POLYSTYRENE

CROSS-REFERENCE

This is a division of application Ser. No. 07/362,129, filed on Jun. 6, 1989, of James L. Denver and James C. Gill, for "High Impact Polystyrene Containing Low Molecular Weight Brominated Polysyrene."

FIELD OF THE INVENTION

The present invention relates to the use of low molecular weight brominated polystyrenes in high impact polystyrene, whereby good retention of physical properties including impact strength is obtained while achieving excellent flame retardancy.

BACKGROUND

A brominated polystyrene having a degree of polymerization of approximately 2,000.when used in high impact polystyrene provides excellent flame retardancy and stability but has a very negative effect on key physical properties such as impact strength. This effect is generally unacceptable.

U.S. Pat. No. 3,075,944 relates to flame retardant compositions containing polyolefins which can be made by substituting a diaromatic or an aromatic aliphatic ether containing at least three bromine atoms.

U.S. Pat. No. 3,830,766 relates to flameproofing acrylonitrile-butadiene-styrene (ABS)polymers by incorporating therein an aromatic bromine compound, antimony trioxide or antimony oxychloride and optionally an organo chlorine compound.

U.S. Pat. No. 3,897,373 relates to thermoplastic molding compositions based on styrene polymers and flameproofed with an organic bromine compound. They contain a synergistic azo compound and may be converted to self-extinguishing shaped articles or profiles.

U.S. Pat. No. 3,943,195 relates to a thermoplastic molding material based on styrene polymers and olefin polymers which have been flameproofed with an organic bromine compound. Brominated oligomers or polymers of dialkylbenzenes, trialkylbenzenes or tetraalkylbenzenes serve as flameproofing agents. The molding material may be processed into self-extinguishing moldings.

U.S. Pat. No. 3,962,164 relates to flameproofing acrylonitrile-butadiene-styrene (ABS) polymers, incorporating therein certain mono- and diphenyl aromatic bromine compounds such as octabromodiphenyl, antimony trioxide, or antimony oxychloride and optionally an organo chlorine compound.

U.S. Pat. No. 4,049,622 relates to thermoplastic molding compositions based on styrene polymers, preferably formed styrene polymers, which have been flameproofed with an organic bromine compound.

U.S. Pat. No. 4,074,032 relates to a process for the manufacture of heat-stable, brominated oligostyrenes by brominating selectively hydrogenated oligostyrenes in halogenated solvents in the presence of Lewis acids at from about minus 25° C. to 20° C. The brominated oligomers are highly heat-stable and can be processed, by themselves or as components of mixtures with other thermoplastics, to give various shaped articles.

U.S. Pat. No. 4,107,231 relates to flameproofed linear polyesters containing. as flameproofing agents, halogenated oligomeric styrenes and synergistic compounds.

U.S. Pat. No. 4,137,212 relates to a flameproofed nylon molding composition which can be processed by thermoplastic methods and which contains. as the flameproofing agent, from 5 to 30 percent by weight of brominated styrene oligomers and a synergistic metal oxide. The composition may be used for the manufacture of injection moldings for the electrical industry.

U.S. Pat. No. 4,143,221 relates to styrene polymers or copolymers containing bromine which are manufactured by cationic polymerization of the monomer, or of the monomer plus a copolymerizable monomer of the isobutylene or nuclear-alkylated styrene type, in an organic solvent in the presence of a Lewis acid catalyst. Bromine is then added to the solution without first working up the latter. The catalyst used for the bromination is the same as that used for the polymerization. If necessary, fresh catalyst may be added before the bromination. After completion of the bromination, the reaction solution is extracted with water until it is bromide-free, and the solvent, generally a halohydrocarbon, is then stripped off. Products containing up to about 80 percent by weight of bromine may be obtained. They have a pale yellowish color and exhibit no significant decomposition up to 340° C. They may be used as flameproofing agents for thermoplastics.

U.S. Pat. No. 4,151,223 relates to fibers and filaments of linear thermoplastic polyesters, containing halogen-containing flameproofing agents and synergistic agents therefor, in which the flameproofing agents are chlorinated and/or brominated oligomeric styrenes. The fibers and filaments of the invention are used for the manufacture of textiles of low flammability.

U.S. Pat. No. 4,200,702 relates to thermoplastic molding compositions based on rubber-modified styrene-acrylonitrile copolymers containing a halogenated styrene oligomer as the effective flameproofing agent which is sufficiently heat-stable, does not interfere with processing on conventional machinery. does not corrode or cause coatings on such machinery, and has virtually no adverse effect on the impact strength of the polymers. The flameproofing agent as a rule has a degree of polymerization of from 3 to 200 and can be incorporated into the polymer by conventional methods; the polymer may or may not contain additional synergistic agents and processing auxiliaries, which are incorporated in the conventional manner and in the conventional amounts.

U.S. Pat. No. 4,360,455 relates to a mixture of brominated oligomeric polystyrenes having a degree of polymerization of from 3 to 400, and low molecular weight brominated aromatic compounds of the diphenyl ether type which are obtained by polymerizing the non-brominated starting materials, in a halohydrocarbon solvent, using a Lewis acid catalyst. The reaction mixture is then brominated and extracted with water to remove hydrogen bromine and catalyst, and the solvent and volatile constituents are separated from the product. The bromination is carried out at from minus 30° C. to 130° C. The final mixtures have a low melt viscosity and are therefore particularly suitable for incorporation, as a flameproofing agent, into thermoplastics.

U.S. Pat. No. 4,352,909, to Barda et al relates to a process for producing a trihalogenated polystyrene flame retardant for synthetic resins, whereby high molecular weight polystyrene is reacted with bromine chloride in a chlorinated hydrocarbon solvent, under substantially anhydrous conditions, in the presence of a catalytic amount of a Lewis acid.

German Patentschrift 151,075 relates to self-extinguishing polystyrene compositions containing brominated oligomers of alpha methyl-styrene as flame retardants with minimum loss of mechanical properties. The oligomer contains from 40 to 70 weight percent ringbound bromine and has a molecular weight of from about 1,000 to about 5,000.

SUMMARY OF THE INVENTION

It has been found that the molecular weight of a brominated low molecular weight polystyrene is an important factor in property retention in that unexpectedly good property retention has been obtained when said polystyrenes are blended with high impact polystyrene (HIPS) and that good or excellent flame retardancy, for example UL-94 VO at 1/8 inch thickness is also achieved. The low molecular weight brominated polystyrene of the present invention generally have a degree of polymerization of from about 3 to about 20 and a halogenated content, e.g., bromine, of from about 53 percent to about 76 percent by weight.

DETAILED DESCRIPTION OF THE INVENTION

High impact polystyrene is commercially available and is well known to the literature as well as to the art. High impact polystyrene (HIPS) is produced from styrene monomers along with elastomers and is generally available in various impact-strength grades. HIPS is generally produced by introducing elastomers such as polybutadiene into the polystyrene matrix for impact modification and is generally produced by either a suspension process or more preferably by a mass continuous polymerization process.

The low molecular weight brominated polystyrenes of the present invention are oligomers and generally have a degree of polymerization, i.e., number of repeating units, of from about 3 to about 20, generally from about 5 to about 15, desirably from about 6 to about 12, and preferably from about 7 to about 9. The repeating units generally have the formula

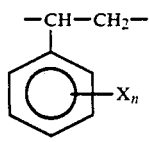

The halogen X such as bromine is present in an amount of from about 1.5 to about 4.0 molecules per repeating unit. The amount of the bromine is generally from about 53 percent to about 76 percent, desirably from about 61 percent to about 71 percent, and preferably from about 66 percent to about 70 percent by weight with regard to the total weight of each repeating unit. The molecular weight distribution of the oligomers is generally narrow such as at 4.0 or less, and preferably 2.5 or less.

Retention of impact properties when using low molecular weight brominated polystyrenes as flame retardants is a function of molecular weight and the degree of bromination. As the molecular weight increases, impact retention will decline at a constant bromine level. Conversely, as the bromine content incorporated with the polystyrene increases, impact retention will decline at a given or constant molecular weight. Therefore, optimization of property retention is generally a balancing of such factors.

The amount of the low molecular weight brominated polystyrene oligomer utilized is generally an effective amount to achieve good flame retardancy. In other words, effective amounts of the low molecular weight brominated polymers are utilized to produce good flame retardancy but as an unexpected result, effective or superior impact retention is obtained, especially in comparison with high molecular weight brominated polystyrene having a degree of polymerization of approximately 2,000. An effective level of flame retardance would be, for example, VO at ⅛ inch thickness UL-94. Physical properties which are notably retained include impact strength such as measured by notched Izod, reverse Izod, Gardner impact, elongation, and the like.

Effective amounts of the brominated polystyrene oligomer of the present invention are generally from about 3 percent to about 20 percent by weight, desirably from about 10 percent to about 18 percent by weight, and preferably from about 14 to about 16 percent by weight of the oligomer based upon the total weight of the oligomer and the high impact resistant polystyrene.

The compositions of the present invention can be readily mixed and processed on conventional equipment such as extruders, Banburys, two-roll mills, and the like, do not cause mold fouling, and are non-blooming. Blending takes place at a temperature generally above the melting point of HIPS such as from about 250° F. to about 500° F.

The blends of the present invention can contain various conventional additives in conventional amounts as known to the art as well as to the literature. For example, the HIPS can contain various conventional ultraviolet light inhibitors, various lubricant agents such as calcium stearate, and the like. Additives which are generally utilized due to their low cost and effective flame retarding properties are various antimony base synergists, equivalences thereof, derivatives thereof, and the like, with a typical example being antimony trioxide. The amount of antimony base synergists is generally based upon the amount of brominated polystyrene and generally ranges from about 1 part for every 2 to 5 parts by weight of the brominated polystyrene. The various additives and flame retardants such as antimony trioxide can either be added directly to the HIPS and blended therewith and subsequently this mixture blended with the low molecular weight brominated polystyrenes or, alternatively, added to and blended with the low molecular weight brominated polystyrenes and subsequently blended with the HIPS. The blends of the present invention generally have a flame retardance of VO at ⅛ inch UL-94. Generally, any conventional mixing device can be utilized such as an extruder, a Banbury, a two-roll mill, or the like. The blends of the present invention can be utilized wherever flame retardancy HIPS is desired such as for small appliances, television cabinets, computer housings, and the like.

The invention will be better understood by reference to the following examples.

EXAMPLES

Test Procedures for Examples

|  | ASTM TEST METHOD |
|---|---|
| Tensile Strength (psi) | D-638 |
| Elongation at Break (%) | D-638 |
| Flex Strength (psi) | D-790 |
| Tangent Modulus × $10^5$ (psi) | D-790 |
| Notched Izod ⅛" (ft-lb/in) | D-256-A |
| Reverse Izod ⅛" (ft-lb/in) | D-256-E |
| Gardner Impact (in-lbs) | D-3029 |
| UL 94 ⅛" Bars | UL 94 |
| Oxygen Index | D-2863 |

Footnotes for Examples 1 through 8
PS Polystyrene
DP Degree of polymerization which specifies the polymer chain length by the number of repeating units in the chain.
Pyro Chek 68 PB A brominated polystyrene having a DP-32 2,000 and typically a bromine content of about 66.5 percent by weight.

EXAMPLE 1

|  | A | B | C | D | E |
|---|---|---|---|---|---|
| High Impact PS (Huntsman 3037) | 95 | 80 | 83 | 82 | 80 |
| Calcium Stearate | 1 | 1 | 1 | 1 | 1 |
| $Sb_2O_3$ | 4 | 4 | 4 | 4 | 4 |
| Pyro Chek 68 PB | — | 15 | — | — | — |
| Decabromodiphenyloxide | — | — | 12 | — | — |
| 1.2-Bis(tetrabromophthalimido)ethane | — | — | — | 13 | — |
| Brominated PS (DP 13) | — | — | — | — | 15 |
| Tensile Strength (psi) | 4800 | 4700 | 5000 | 4600 | 4900 |
| Elongation at Break (%) | 81 | 13 | 11 | 44 | 66 |
| Flexural Strength (psi) | 9600 | 9400 | 10000 | 9000 | 9800 |
| Tangent Modulus × $10^5$ (psi) | 3.6 | 3.9 | 3.7 | 3.9 | 3.8 |
| Notched Izod (ft-lb/in) | 1.7 | 0.6 | 1.4 | 0.9 | 1.1 |
| Reverse Izod ⅛" (ft-lb/in) | 12.0 | 2.7 | 9.0 | 6.0 | 8.0 |
| Gardner Impact (in-lbs) | 18 | 3 | 6 | 6 | 5 |
| UL94 ⅛" Bars | Fail | Fail | V-1 | V-O | V-O |
| Oxygen Index | 19.6 | 23.8 | 25.4 | 25.2 | 24.9 |

EXAMPLE 2

|  | A | B | C | D | E | F | G |
|---|---|---|---|---|---|---|---|
| High Impact PS (Huntsman 3037) | 100 | 81 | 81 | 81 | 81 | 81 | 81 |
| $Sb_2O_3$ | — | 4 | 4 | 4 | 4 | 4 | 4 |
| Pyro Chek 68 PB | — | 15 | — | — | — | — | — |
| Brominated PS (DP6) | — | — | 15 | — | — | — | — |
| Brominated PS (DP8) | — | — | — | 15 | — | — | — |
| Brominated PS (DP13) | — | — | — | — | 15 | — | — |
| Brominated PS (DP20) | — | — | — | — | — | 15 | — |
| Brominated PS (DP40) | — | — | — | — | — | — | 15 |
| Tensile Strength (psi) | 4100 | 4500 | 3400 | 3100 | 4000 | 4300 | 4300 |
| Elongation Break (%) | 39.0 | 7.2 | 4.0 | 3.6 | 4.1 | 4.2 | 5.5 |
| Flex Strength (psi) | 9500 | 9300 | 8800 | 9000 | 9300 | 8600 | 8700 |
| Tangent Modulus × $10^5$ (psi) | 3.3 | 3.4 | 3.4 | 3.2 | 3.4 | 3.6 | 3.4 |
| Notched Izod ⅛" (ft-lb/in) | 1.61 | 0.59 | 1.16 | 1.13 | 0.86 | 0.80 | 0.79 |
| Reverse Izod ⅛" (ft-lb/in) | 9.68 | 2.19 | 6.99 | 5.88 | 5.93 | 6.12 | 6.91 |
| Gardner Impact (in-lbs) | 24.6 | 3.0 | 6.3 | 5.5 | 3.2 | 3.0 | 3.0 |
| UL 94 ⅛" Bars | Fail | V-O | V-O | V-O | V-O | V-O | V-O |

EXAMPLE 3

|  | A | B | C | D | E |
|---|---|---|---|---|---|
| High Impact PS (Huntsman 3037) | 100 | 81 | 84 | 81 | 81 |
| $Sb_2O_3$ | — | 4 | 4 | 4 | 4 |
| Pyro Chek 68 PB | — | 15 | — | — | — |
| Decabromodiphenyloxide | — | — | 12 | — | — |
| Brominated PS (DP13) | — | — | — | 15 | — |
| Brominated PS (DP8) | — | — | — | — | 15 |
| Tensile Strength (psi) | 4540 | 4556 | 4553 | 4455 | 3890 |
| Elongation at Break (%) | 47.7 | 6.8 | 4.9 | 5.1 | 4.0 |
| Flex Strength (psi) | 9830 | 9661 | 10218 | 9906 | 9865 |
| Tangent Modulus × $10^5$ (psi) | 3.2 | 3.5 | 3.5 | 3.4 | 3.3 |

-continued

|  | A | B | C | D | E |
|---|---|---|---|---|---|
| Notched Izod ⅛" (ft-lb/in) | 1.6 | 0.58 | 1.2 | 0.97 | 1.1 |
| Reverse Izod ⅛" (ft-lb/in) | 13.4 | 2.6 | 8.5 | 7.2 | 8.6 |
| Gardner Impact (in-lbs) | 30 | 3.0 | 7.0 | 4.0 | 5.0 |
| UL 94 ⅛" Bars | Fail | V-O | V-O | V-O | V-O |

EXAMPLE 4

|  | A | B | C | D | E |
|---|---|---|---|---|---|
| High Impact PS (Huntsman 3037) | 100 | 84 | 81 | 81 | 81 |
| Sb₂O₃ | — | 4 | 4 | 4 | 4 |
| Decabromodiphenyloxide | — | 12 | — | — | — |
| Pyro Chek 68 PB | — | — | 15 | — | — |
| Brominated PS (DP13) | — | — | — | 15 | — |
| Brominated PS (DP9) | — | — | — | — | 15 |
| Tensile Strength (psi) | 4720 | 5090 | 4230 | 4630 | 4500 |
| Elongation at Break (%) | 44 | 7.0 | 5.7 | 6.2 | 5.2 |
| Flex Strength (psi) | 9960 | 10700 | 9740 | 10470 | 9830 |
| Tangent Modulus × 10⁵ (psi) | 3.41 | 3.73 | 3.70 | 3.71 | 3.70 |
| Notched Izod ⅛" (ft-lb/in) | 1.8 | 1.4 | 0.7 | 0.9 | 1.5 |
| Reverse Izod ⅛" (ft-lb/in) | 11.4 | 7.5 | 2.0 | 8.4 | 8.5 |
| UL 94 ⅛" Bars | Fail | V-O | V-O | V-O | V-O |
| Oxygen Index | 18.0 | 26.7 | 23.4 | 25.8 | 26.5 |

EXAMPLE 5

|  | A | B | C | D | E |
|---|---|---|---|---|---|
| High Impact PS (Am. Hoechst 840) | 100 | 84 | 81 | 81 | 81 |
| Sb₂O₃ | — | 4 | 4 | 4 | 4 |
| Decabromodiphenyloxide | — | 12 | — | — | — |
| Pyro Chek 68 PB | — | — | 15 | — | — |
| Brominated PS (DP13) | — | — | — | 15 | — |
| Brominated PS (DP9) | — | — | — | — | 15 |
| Tensile Strength (psi) | 3520 | 3740 | 3430 | 3820 | 3890 |
| Elongation at Break (%) | 65 | 82 | 22 | 62 | 63 |
| Flex Strength (psi) | 7550 | 7600 | 7360 | 7870 | 8420 |
| Tangent Modulus × 10⁵ (psi) | 3.41 | 3.73 | 3.63 | 3.70 | 3.73 |
| Notched Izod ⅛" (ft-lb/in) | 3.4 | 2.4 | 1.0 | 2.3 | 2.1 |
| Reverse Izod ⅛" (ft-lb/in) | 14.3 | 11.7 | 2.2 | 11.1 | 10.2 |
| UL 94 ⅛" Bars | Fail | V-O | V-O | V-O | V-O |
| Oxygen Index | 17.5 | 26.7 | 23.8 | 25.0 | 26.3 |

EXAMPLE 6

|  | A | B | C | D | E |
|---|---|---|---|---|---|
| High Impact PS (Dow Styron 498) | 100 | 96 | 84 | 81 | 81 |
| Sb₂O₃ | — | 4 | 4 | 4 | 4 |
| Decabromodiphenyloxide | — | — | 12 | — | — |
| Pyro Chek 68 PB | — | — | — | 15 | — |
| Brominated PS (DP8) | — | — | — | — | 15 |
| Tensile Strength (psi) | 4250 | 4290 | 4530 | 4270 | 4340 |
| Elongation at Break (%) | 61 | 69 | 33 | 10 | 11 |
| Flex Strength (psi) | 9340 | 9110 | 9780 | 9390 | 9820 |
| Tangent Modulus × 10⁵ (psi) | 3.67 | 3.76 | 3.87 | 4.09 | 3.86 |
| Notched Izod ⅛" (ft-lb/in) | 2.0 | 1.8 | 1.1 | 0.5 | 0.9 |
| Reverse Izod ⅛" (ft-lb/in) | 7.1 | 6.8 | 5.9 | 1.9 | 5.5 |
| Gardner Impact (in-lbs) | 9.8 | 7.2 | 4.2 | <2 | 2.8 |
| UL 94 ⅛" Bars | Fail | Fail | V-O | V-O | V-O |

EXAMPLE 7

|  | A | B | C | D | E |
|---|---|---|---|---|---|
| High Impact PS (Dow Styron 498) | 100 | 96 | 84 | 81 | 81 |
| Sb₂O₃ | — | 4 | 4 | 4 | 4 |
| Decabromodiphenyloxide | — | — | 12 | — | — |
| Pyro Chek 68 PB | — | — | — | 15 | — |
| Brominated PS (DP8) | — | — | — | — | 15 |
| Tensile Strength (psi) | 3420 | 3320 | 3490 | 3500 | 3610 |

-continued

|  | A | B | C | D | E |
| --- | --- | --- | --- | --- | --- |
| Elongation at Break (%) | 80 | 63 | 70 | 26 | 38 |
| Flex Strength (psi) | 7350 | 7340 | 7710 | 7420 | 7850 |
| Tangent Modulus $\times 10^5$ (psi) | 3.42 | 3.5 | 3.76 | 3.73 | 3.54 |
| Notched Izod 1/8" (ft-lb/in) | 2.1 | 2.0 | 1.5 | 0.6 | 1.2 |
| Reverse Izod 1/8" (ft-lb/in) | 10.5 | 9.7 | 6.1 | 1.9 | 6.5 |
| Gardner Impact (in-lbs) | 21 | 13 | 5.2 | 2.7 | 3.0 |
| UL 94 1/8" Bars | Fail | Fail | V-O | V-O | V-O |

The various Examples generally demonstrate that property retention is much better with a low molecular weight brominated polystyrene as opposed to a high molecular weight polystyrene such as Pyro Chek 68 PB. Example 2 generally demonstrates that as the degree of polymerization of the brominated polystyrene is increased, the physical property retentions such as notched Izod decreases. Examples 3 through 7 show good property retention using the low molecular weight brominated polystyrenes of the present invention as compared to a high molecular weight brominated polystyrene as well as that good property retention is obtained utilizing a variety of high impact polystyrenes made by different manufacturers.

While in accordance with the Patent Statutes, the best mode and preferred embodiment has been set forth, the scope of the invention is not limited thereto, but rather by the scope of the attached claims.

What is claimed is:

1. A process for making a flame retarded, high impact polystyrene composition, comprising the steps of:
   melt blending a high impact resistant polystyrene with a low molecular weight brominated polystyrene having a degree of polymerization of from about 3 to about 20 and an antimony based synergist, the amount of said antimony based synergist being about 1 part by weight for every about 2 to about 5 parts by weight of said low molecular weight brominated polystyrene, and providing a composition having a flame retardancy of V-O at 1/8 inch in the UL-94 test and good physical retention of Izod, the amount of said low molecular weight brominated polystyrene being from about 3 percent to about 20 percent by weight based upon a total weight of said brominated polystyrene and said high impact resistant polystyrene.

2. A process according to claim 1, wherein the amount of bromine in said polystyrene based upon the total weight of said brominated polystyrene is from about 53 percent to about 76 percent by weight.

3. A process according to claim 2, and wherein the amount of said bromine is from about 61 percent to about 71 percent by weight.

4. A process according to claim 3, wherein said degree of polymerization is from about 6 to about 12.

5. A process according to claim 4, wherein said degree of polymerization is from about 7 to about 9, and wherein the amount of said bromine is from about 66 percent to abut 76 percent by weight.

6. A process according to claim 1, wherein the amount of bromine in said polystyrene based upon the total weight of said brominated polystyrene is from about 66 percent to about 76 percent by weight.

7. A process according to claim 6, wherein said degree of polymerization is from about 5 to about 15, and wherein the amount of said brominated polystyrene is from about 10 percent to about 18 percent by weight.

8. A process according to claim 7, wherein said degree of polymerization is from about 7 to about 9, and wherein said amount of bromine is from about 70 to about 76 percent by weight.

* * * * *